(12) United States Patent
Komedani et al.

(10) Patent No.: US 8,639,707 B2
(45) Date of Patent: Jan. 28, 2014

(54) RETRIEVAL DEVICE, RETRIEVAL SYSTEM, RETRIEVAL METHOD, AND COMPUTER PROGRAM FOR RETRIEVING A DOCUMENT FILE STORED IN A STORAGE DEVICE

(75) Inventors: Masaki Komedani, Kanagawa (JP); Hirofumi Nishikawa, Tokyo (JP); Fumihiko Terui, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/970,790

(22) Filed: Dec. 16, 2010

(65) Prior Publication Data

US 2011/0153625 A1 Jun. 23, 2011

(30) Foreign Application Priority Data

Dec. 22, 2009 (JP) ................................. 2009-290045

(51) Int. Cl.
*G06F 17/30* (2006.01)

(52) U.S. Cl.
USPC .................................. 707/754; 707/E17.022

(58) Field of Classification Search
None
See application file for complete search history.

(56) References Cited

U.S. PATENT DOCUMENTS

| | | | |
|---|---|---|---|
| 8,046,365 B2 | 10/2011 | Saito | |
| 2001/0027451 A1* | 10/2001 | Taguchi et al. | 707/3 |
| 2004/0098619 A1* | 5/2004 | Shay | 713/201 |
| 2007/0226174 A1 | 9/2007 | Saito | |

FOREIGN PATENT DOCUMENTS

| | | |
|---|---|---|
| JP | 2001344245 | 12/2001 |
| JP | 2005259112 A | 9/2005 |
| JP | 2007018309 | 1/2007 |
| JP | 2007257405 A | 10/2007 |
| JP | 2007323357 | 12/2007 |
| JP | 2008287407 A | 11/2008 |

OTHER PUBLICATIONS

Abstract and Machine Translation of Publication No. JP2007018309, dated Jan. 25, 2007, 52 pp.
Abstract and Machine Translation of Publication No. JP2001344245, dated Dec. 14, 2001, 59 pp.
Abstract and Machine Translation of Publication No. JP2007323357, dated Dec. 13, 2007, 105 pp.
English Abstract for JP2007257405A, published on Oct. 4, 2007, Total 2 pp. [JP2007257405A has English Counterparts: US20070226174 & US8046365, which are listed above].

(Continued)

*Primary Examiner* — Anteneh Girma
(74) *Attorney, Agent, or Firm* — Janaki K. Davda; Konrad, Raynes, Davda and Victor LLP

(57) ABSTRACT

Retrieval is completed in a short time for presenting a retrieval result of a document file, which satisfies a retrieval condition, to a user having the authority to perform predetermined processing. A retrieval device includes a correspondence information generating unit for generating correspondence information indicating membership of a user to a group, an index information generating unit for generating index information by extracting user identification information associated with group identification information included in authority information provided to a document file from the correspondence information, the index information including information in which the extracted user identification information is associated with the document file, and a retrieving unit for retrieving a document file, which satisfies a retrieval condition whose input is received by an input receiving unit and in which the user identification information included in the index information coincides with user information whose input is received.

19 Claims, 9 Drawing Sheets

(56) References Cited

OTHER PUBLICATIONS

IDS Report, May 29, 2012, from the May 29, 2012 Office Action for JP920090088JP1, Total 3 pp.

Information Materials for IDS from JP Office Action, dated Aug. 23, 2011, 1 page.

Patent Abstract and Machine Translation for JP2005259112A, published on Sep. 22, 2005, Total 46 pp.

Patent Abstract and Machine Translation for JP2008287407A, published on Nov. 27, 2008, Total 32 pp.

IDS Report, Aug. 28, 2012, from the Aug. 28, 2012 Office Action for JP920090088JP1, Total 3 pp.

\* cited by examiner

RETRIEVAL DEVICE, RETRIEVAL SYSTEM, RETRIEVAL METHOD, AND COMPUTER PROGRAM FOR RETRIEVING A DOCUMENT FILE STORED IN A STORAGE DEVICE

CROSS-REFERENCE TO RELATED FOREIGN APPLICATION

This application is a non-provisional application that claims priority benefits under Title 35, Unites States Code, Section 119(a)-(d) or Section 365(b) of Japanese Patent Application No. 2009-290045, filed on Dec. 22, 2009, by Hirofumi Nishikawa, Fumihiko Terui, and Masaki Komedani, which application is incorporated herein by reference in its entirety.

FIELD OF THE INVENTION

The present invention relates to a retrieval device, a retrieval system, a retrieval method, and a computer program for retrieving a document file, which satisfies a retrieval condition and for which a retrieving user has the authority or permission to perform predetermined processing, from document files stored in a storage device.

BACKGROUND OF THE INVENTION

Along with the recent popularization of computers and the Internet, a huge number of document files have been made and stored in storage devices, which increases the necessity for a retrieval device capable of accurately retrieving a required document file at high speed. Particularly, from the viewpoint of security, more and more companies are realizing the necessity for a retrieval device for presenting a retrieval result of a document file, which satisfies a retrieval condition, only to a user having the authority to perform predetermined processing (for example, viewing, editing, etc.) in addition to the processing of retrieving a document file from a storage device which stores a huge number of document files.

As a retrieval device considered in terms of security, for example, Japanese Patent Application Publication No. 2007-18309 discloses a database device which allows only a user having the authority to perform predetermined processing to perform the processing. The database device disclosed in Japanese Patent Application Publication No. 2007-18309 is connected to an attribute management server for storing attribute information of a business server and to a database access controller for acquiring attribute information from the attribute management server via a network to manage data objects. When the business server accesses a data object (for example, a document file), the database access controller, which has a context storage unit for storing attribute information (for example, authority information) of the business server acquired from the attribute management server, controls the access from the business server to the data object on the basis of the attribute information stored in the context storage unit.

Moreover, the conventional retrieval device considered in terms of security generates index information associating group identification information, user identification information, and a document file with one another from authority information provided to the document file with respect to the document file provided with the authority information including the group identification information for identifying a group having the authority to perform predetermined processing and the user identification information for identifying a retrieving user and presents a result of retrieving the document file which satisfies the retrieval condition only to the user having identification information coinciding with the user identification information included in the generated index information.

SUMMARY OF THE INVENTION

Problems to be Solved by the Invention

Authority information provided to a document file, however, is often modified independently of the content of the document file. If the authority information provided to the document file is modified, a security problem occurs unless the corresponding index information is updated, such that the retrieval result of the document file is presented to users who are not allowed to view the retrieval result by definition. Particularly, if the authority information provided to the document file is modified and thereafter the corresponding index information has not been updated for a long time, a security problem occurs, such that the retrieval result of the document file is erroneously presented to a user having identification information coinciding with the user identification information included in the index information which is not updated yet. Therefore, it is desirable to reduce the time until the index information of the document file is updated by reflecting the modified authority information on the index information of the document file efficiently.

Moreover, the index information of the document file includes group identification information besides the user identification information. Therefore, the retrieval device is not able to retrieve the document file provided with the authority information including the group identification information of a group to which the retrieving user belongs only by retrieving the document file, in which the user identification information included in the index information coincides with the user information indicating the user and which is provided with the authority information including the user identification information. To retrieve the document file, the retrieval device needs to retrieve a document file in which the user identification information included in the index information coincides with the user information indicating the retrieving user or in which the group identification information included in the index information coincides with the group information of the group to which the retrieving user belongs. In other words, the retrieval device needs to retrieve the document file on the basis of a condition under which the user identification information or the group identification information included in the index information coincides with the user information or the group information (OR condition), thereby increasing processing load in comparison with the case of retrieving the document file on the basis of the condition under which the user identification information included in the index information coincides with the user information indicating the retrieving user and thus making it difficult to complete the retrieval in a short time problematically.

Means for Solving the Problems

The present invention has been made in view of the above circumstances. Therefore, it is an object of the present invention to provide a retrieval device, a retrieval system, a retrieval method, and a computer program capable of completing retrieval in a short time for presenting a retrieval result of a document file, which satisfies a retrieval condition, to a user having the authority or permission to perform predetermined processing. Further, it is another object of the present invention to provide a retrieval device, a retrieval system, a retrieval method, and a computer program capable of reducing the time until the index information of the document file is updated by efficiently reflecting modified authority information on the index information of the document file.

Means for Solving the Problems

In order to achieve the above object, according to a first invention, there is provided a retrieval device for retrieving a document file, which is provided with authority information including group identification information for identifying a group having the authority to perform predetermined processing and user identification information for identifying a user having the authority, including a correspondence information generating unit for generating correspondence information indicating membership of a user to a group as information indicating correspondence between the group identification information and the user identification information with respect to all group identification information and user identification information included in the authority information provided to the document file to be retrieved, an index information generating unit for generating index information by extracting the user identification information associated with the group identification information included in the authority information provided to the document file from the generated correspondence information, the index information including information in which the extracted user identification information is associated with the document file, an input receiving unit for receiving an input of a retrieval condition and an input of user information indicating a retrieving user, and a retrieving unit for retrieving a document file, which satisfies the retrieval condition whose input is received and in which the user identification information included in the index information coincides with the user information whose input is received.

Moreover, a retrieval device according to a second invention further includes an index information updating unit for extracting the index information associated with updated group identification information and/or user identification information in the case of an update of the group identification information and/or user identification information included in the authority information provided to the document file and then updating the extracted index information on the basis of the updated group identification information and/or user identification information in the first invention.

In order to achieve the above object, according to a third invention, there is provided a retrieval system having a storage device which stores document files provided with authority information including group identification information for identifying a group having the authority to perform predetermined processing and user identification information for identifying a user having the authority and a retrieval device which retrieves a document file from the storage device, wherein the retrieval device includes a correspondence information generating unit for generating correspondence information indicating membership of a user to a group as information indicating correspondence between the group identification information and the user identification information with respect to all group identification information and user identification information included in the authority information provided to the document file to be retrieved, an index information generating unit for generating index information by extracting the user identification information associated with the group identification information included in the authority information provided to the document file from the generated correspondence information, the index information including information in which the extracted user identification information is associated with the document file, an input receiving unit for receiving an input of a retrieval condition and an input of user information indicating a retrieving user, and a retrieving unit for retrieving a document file, which satisfies the retrieval condition whose input is received and in which the user identification information included in the index information coincides with the user information whose input is received.

Moreover, in a retrieval system according to a fourth invention, the retrieval device further includes an index information updating unit for extracting the index information associated with updated group identification information and/or user identification information in the case of an update of the group identification information and/or user identification information included in the authority information provided to the document file and then updating the extracted index information on the basis of the updated group identification information and/or user identification information in the third invention.

In order to achieve the above object, according to a fifth invention, there is provided a retrieval method for retrieving a document file, which is provided with authority information including group identification information for identifying a group having the authority to perform predetermined processing and user identification information for identifying a user having the authority, the retrieval method including the steps of generating correspondence information indicating membership of a user to a group as information indicating correspondence between the group identification information and the user identification information with respect to all group identification information and user identification information included in the authority information provided to the document file to be retrieved, generating index information by extracting the user identification information associated with the group identification information included in the authority information provided to the document file from the generated correspondence information, the index information including information in which the extracted user identification information is associated with the document file, receiving an input of a retrieval condition and an input of user information indicating a retrieving user, and retrieving a document file, which satisfies the retrieval condition whose input is received and in which the user identification information included in the index information coincides with the user information whose input is received.

Moreover, a retrieval method according to a sixth invention further includes the step of extracting the index information associated with updated group identification information and/or user identification information in the case of an update of the group identification information and/or user identification information included in the authority information provided to the document file and then updating the extracted index information on the basis of the updated group identification information and/or user identification information in the fifth invention.

In order to achieve the above object, according to a seventh invention, there is provided a computer program which is able to be run on a computer which retrieves a document file, which is provided with authority information including group identification information for identifying a group having the authority to perform predetermined processing and user identification information for identifying a user having the authority, the computer program causing the computer to function as correspondence information generating means for generating correspondence information indicating membership of a user to a group as information indicating correspondence between the group identification information and the user identification information with respect to all group identification information and user identification information included in the authority information provided to the document file to be retrieved, index information generating means for generating index information by extracting the user identification information associated with the group identification information included in the authority information provided to the document file from the generated correspondence information, the index information including information in which the extracted user identification information is associated with the document file, input receiving means for receiving an input of a retrieval condition and an input of user information indicating a retrieving user, and retrieving means for retrieving a document file, which satisfies the retrieval condition whose input is received and in which the user identification information included in the index information coincides with the user information whose input is received.

Moreover, a computer program according to an eighth invention causes the computer to function as index information updating means for extracting the index information associated with updated group identification information and/or user identification information in the case of an update of the group identification information and/or user identification information included in the authority information provided to the document file and then updating the extracted index information on the basis of the updated group identification information and/or user identification information in the seventh invention.

According to the present invention, it is possible to generate correspondence information indicating membership of a user to a group as information indicating correspondence between the group identification information and the user identification information with respect to all group identification information and user identification information included in authority information provided to a document file to be retrieved, to generate index information by extracting user identification information, which is associated with the group identification information included in the authority information provided to the document file, from the generated correspondence information, the index information including information in which the extracted user identification information is associated with the document file, and to retrieve the document file, which satisfies a retrieval condition whose input is received and in which the user identification information included in the index information coincides with the user information whose input is received. This eliminates the necessity to retrieve a document file in which the user identification information included in the index information coincides with the user information indicating the retrieving user or in which the group identification information included in the index information coincides with the group information of the group to which the retrieving user belongs, thereby enabling the retrieval to be completed in a short time with processing load reduced.

Moreover, according to the present invention, in the case of an update of the group identification information included in the authority information provided to the document file and/or the user identification information, the index information associated with the updated group identification information and/or user identification information is extracted and the extracted index information is updated on the basis of the updated group identification information and/or user identification information. Therefore, it is possible to reduce the time until the index information of the document file is updated with modified authority information efficiently reflected on the index information of the document file.

DETAILED DESCRIPTION OF THE INVENTION

Figure 1:
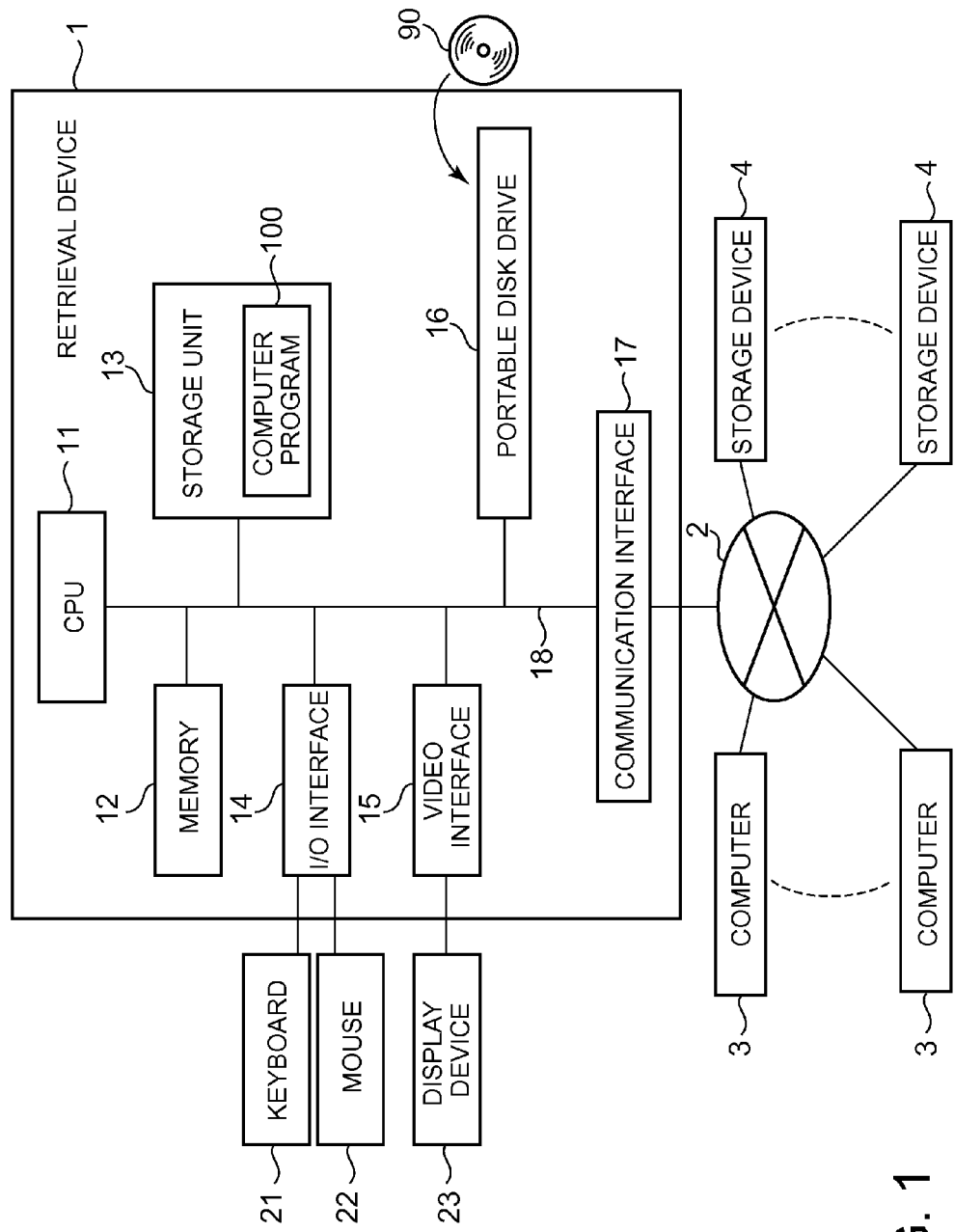
FIG. 1 is a block diagram illustrating a configuration example of a retrieval device according to a first embodiment of the present invention.

Hereinafter, a retrieval device, a retrieval system, a retrieval method, and a computer program for retrieving a document file according to preferred embodiments of the present invention will be described in detail with reference to the accompanying drawings. It should be understood that the following description of the preferred embodiments is not intended to limit the present invention described in the appended claims, but the entire combination of features described in the embodiments is not necessarily essential to the solving means of this invention.

Moreover, the present invention may be practiced in many different embodiments and should not be interpreted as being limited to the described content of the embodiments. The same reference numerals are given to the same elements throughout the descriptions of all the embodiments described in the specification.

In the preferred embodiments described hereinafter, the retrieval device or the retrieval system in which a computer program is introduced into a computer system will be described, though it is apparent to those skilled in the art that the present invention may be implemented as a computer program a part of which is able to be executed in the computer. Therefore, the present invention may be implemented as hardware such as a retrieval device or a retrieval system for retrieving a document file stored in a storage device, software, or a combination of software and hardware. The computer program is able to record information into a recording medium capable of reading the information by an arbitrary computer such as a hard disk, a DVD, a CD, an optical storage, or a magnetic storage.

First Embodiment

Referring to FIG. 1, there is shown a block diagram illustrating a configuration example of a retrieval device 1 according to a first embodiment of the present invention. The retrieval device 1 according to the first embodiment of the present invention is connected to a plurality of computers 3, 3,—and storage devices 4, 4,—via a network 2 so as to be able to perform data communication and therefore is able to retrieve a document file stored in the storage unit contained in each computer 3 or in each storage device 4. Each storage device 4 may be directly connected to the retrieval device 1 without using the network 2. Moreover, the document file to be retrieved may be stored in a distributed manner into the plurality of storage devices 4. In addition, the retrieval system according to the first embodiment of the present invention may include at least the retrieval device 1 and the plurality of storage devices 4, 4,—storing the document file to be retrieved in a distributed manner.

The retrieval device 1 includes at least a central processing unit (CPU) 11, a memory 12, a storage unit 13, an I/O interface 14, a video interface 15, a portable disk drive 16, a communication interface 17, and an internal bus 18 for connecting the foregoing hardware.

The CPU 11 is connected to the above respective hardware units of the retrieval device 1 via the internal bus 18 to control the operations of the respective hardware units and to perform various software functions according to the computer program 100 stored in the storage unit 13. The memory 12 is composed of a volatile memory such as an SRAM or an SDRAM, in which a load module is deployed at runtime of the computer program 100. The memory 12 stores temporary data and other data generated at runtime of the computer program 100.

The storage unit 13 includes a built-in fixed-type storage device (hard disk), a ROM, or the like. The computer program 100 stored in the storage unit 13 is downloaded from a portable recording medium 90 such as a DVD, a CD-ROM, or the like, in which information such as a program and data is recorded, by the portable disk drive 16 and then expanded from the storage unit 13 to the memory 12 at runtime so as to be executed. Naturally, it may be a computer program downloaded from any of the external computers 3, 3,—connected to the network 2 via the communication interface 17. Further, the storage unit 13 stores correspondence information, index information, and other information described later.

The communication interface 17 is connected to the internal bus 18 and is able to transmit or receive data to or from the external computers 3, 3,—or the like by being connected to the external network 2 such as the Internet, a LAN, or a WAN.

The I/O interface 14 is connected to data input mediums such as a keyboard 21 and a mouse 22 to receive data inputs. The video interface 15 is connected to a display device 23 such as a CRT monitor or an LCD to display predetermined images.

Figure 2:
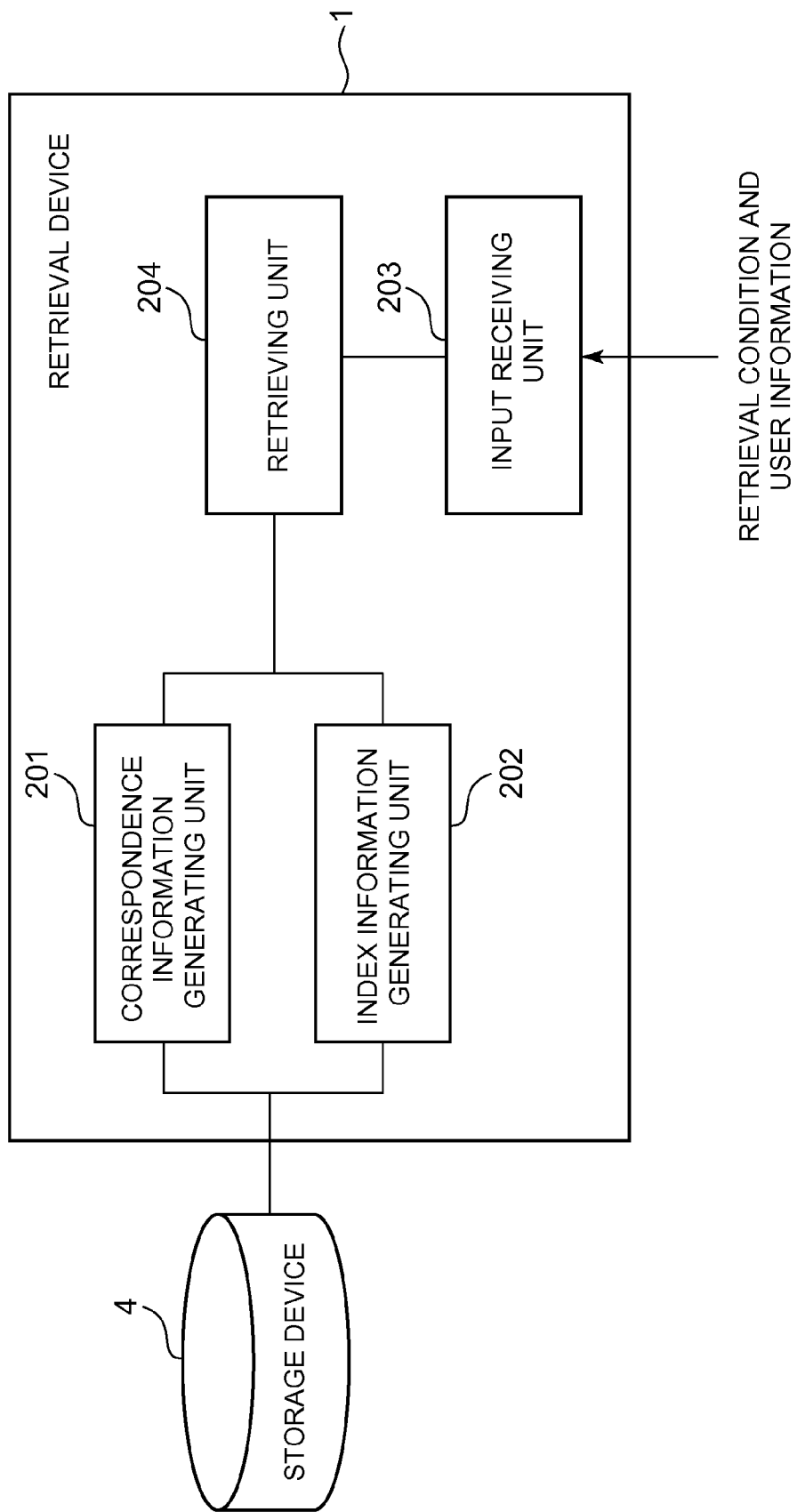
FIG. 2 is a functional block diagram of the retrieval device according to the first embodiment of the present invention.

Hereinafter, the operation of the retrieval device 1 having the above configuration will be described. FIG. 2 shows a functional block diagram of the retrieval device 1 according to the first embodiment of the present invention. The retrieval device 1 includes a correspondence information generating unit 201, an index information generating unit 202, an input receiving unit 203, and a retrieving unit 204.

Figure 3:
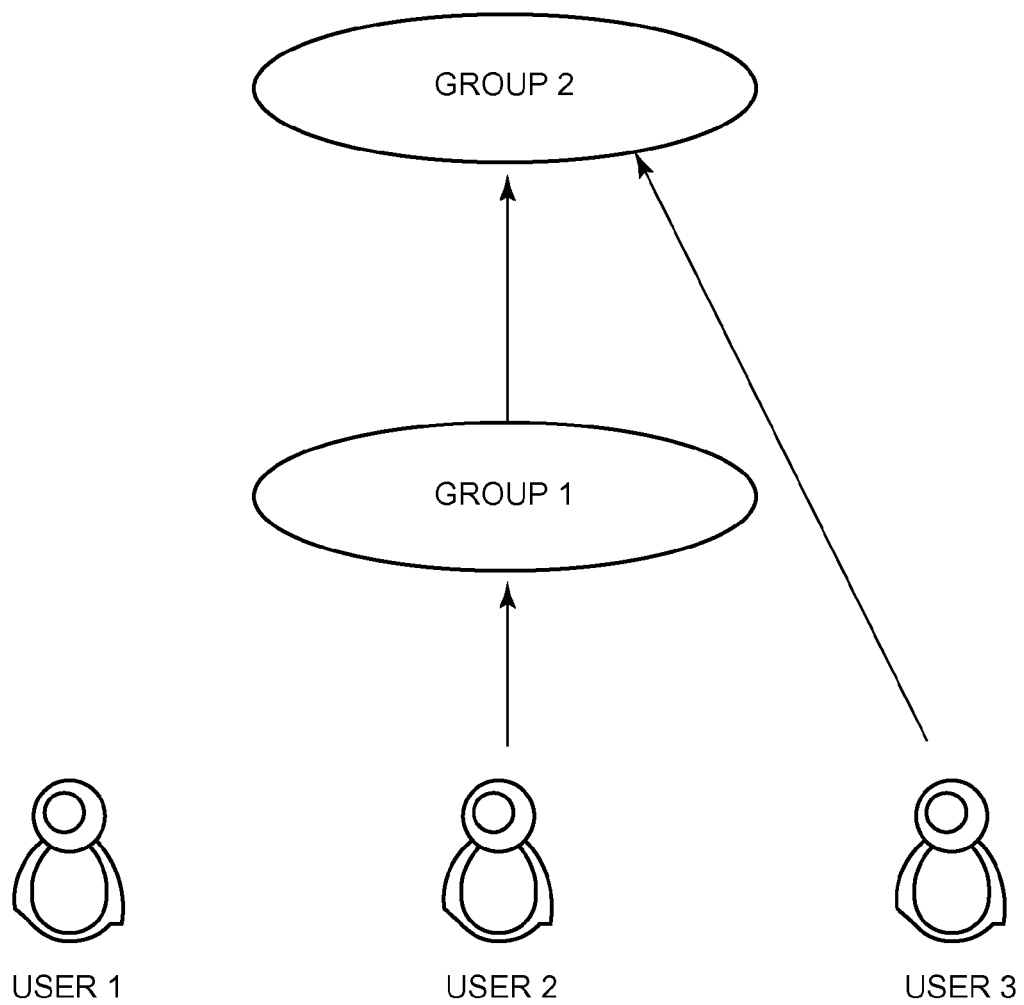
FIG. 3 is an illustrative diagram for describing a relationship between groups and users.

The document file stored in the storage device 4 is provided with authority information including group identification information for identifying a group having the authority or permission to perform predetermined processing (for example, viewing, editing, etc.) and user identification information for identifying a user having the authority. The relationship between groups and users will be described here. FIG. 3 shows an illustrative diagram for describing the relationship between groups and users. In the illustrative diagram shown in FIG. 3, three users, "user 1", "user 2", and "user 3" are allowed to retrieve document files stored in the storage device 4 by using the retrieval device 1. The "user 2" belongs to "group 1" and the "user 3" belongs to "group 2". Meanwhile, the "group 2" includes the "group 1" as a subgroup.

In FIG. 2, the correspondence information generating unit 201 generates correspondence information indicating membership of a user to a group as information indicating correspondence between the group identification information and the user identification information with respect to all group identification information and user identification information included in the authority information provided to the document file to be retrieved, which is stored in the storage device 4. For example, the correspondence information generating unit 201 generates correspondence information indicating that a user belonging to the "group 1" is the "user 2" and that a user belonging to the "group 2" is the "user 3" if the groups and the users have the relationship as shown in FIG. 3.

The index information generating unit 202 generates index information by extracting the user identification information associated with the group identification information included in the authority information provided to the document file from the correspondence information generated by the correspondence information generating unit 201. The index information includes information in which the extracted user identification information is associated with the document file. For example, the index information generating unit 202 extracts information indicating that a user belonging to the "group 2" is the "user 3" and a user belonging to the "group 1" included as a subgroup is the "user 2" from the generated correspondence information in the case of a document file #1 provided with authority information including the "group 2" of the group identification information and generates index information including information in which the extracted user identification information "user 2" and "user 3" are associated with the document file #1. The index information generated by the index information generating unit 202 is stored as attribute information for each document file into the memory 12, the storage unit 13, and the like.

The index information generated by the index information generating unit 202 includes information in which user identification information included in the authority information provided to the document file is associated with the document file and information used in a general retrieval system. For example, supposing that a predetermined word appearing in the document file is used as retrieval information, the information used in the general retrieval system is information in which the appearing word is associated with the document file.

The input receiving unit 203 receives an input of a retrieval condition such as a keyword and an input of user information indicating a retrieving user through the keyboard 21, the mouse 22, or the like. The user information is, for example, a user name, a user ID, or the like used for logging into the computer 3.

The retrieving unit 204 retrieves a document file, which satisfies the retrieval condition whose input is received by the input receiving unit 203 and in which the user identification information included in the index information coincides with the user information whose input is received by the input receiving unit 203. The retrieval result of the document file retrieved by the retrieving unit 204 is presented to the user via the display device 23 shown in FIG. 1. The index information generated by the index information generating unit 202 includes information in which extracted user identification information is associated with the document file after the extraction of the user identification information associated with the group identification information included in the authority information provided to the document file. Therefore, the retrieving unit 204 is able to retrieve a document file provided with the authority information including the group identification information of the group to which the retrieving user belongs only by retrieving a document file in which the user identification information included in the index information coincides with the user information whose input is received by the input receiving unit 203. More specifically, the retrieving unit 204 does not need to retrieve a document file in which the user identification information included in the index information coincides with the user information indicating the retrieving user or in which the group identification information included in the index information coincides with the group information of the group to which the retrieving user belongs, thereby enabling a reduction in processing load and thus enabling the retrieval to be completed in a short time.

In addition, the operation of the retrieving unit 204 is not limited to retrieving the document file which satisfies the retrieval condition according to whether a word in the retrieval information included in the index information of the document file coincides with a word of the retrieval condition whose input is received by the input receiving unit 203, but the retrieving unit 204 may retrieve a document file which satisfies the retrieval condition according to whether a word included in the document file itself stored in the storage device 4 coincides with a word of the retrieval condition whose input is received by the input receiving unit 203. Moreover, the retrieval condition whose input is received by the input receiving unit 203 is not limited to a word, but may be a natural sentence. For example, if the input receiving unit 203 receives an input of a natural sentence, a word may be extracted by morphologically analyzing a natural sentence whose input is received to use the extracted word as a retrieval condition.

Figure 4:
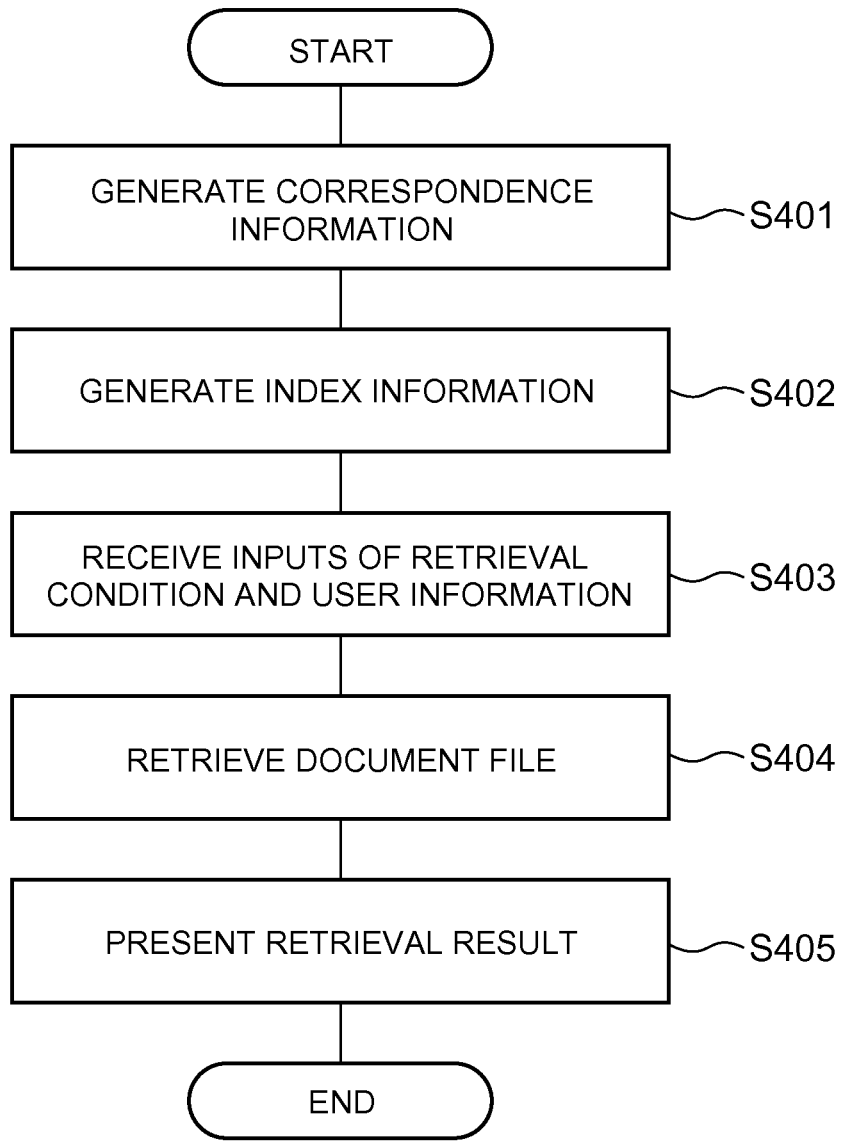
FIG. 4 is a flowchart illustrating a CPU procedure of the retrieval device according to the first embodiment of the present invention.
Figure 5:
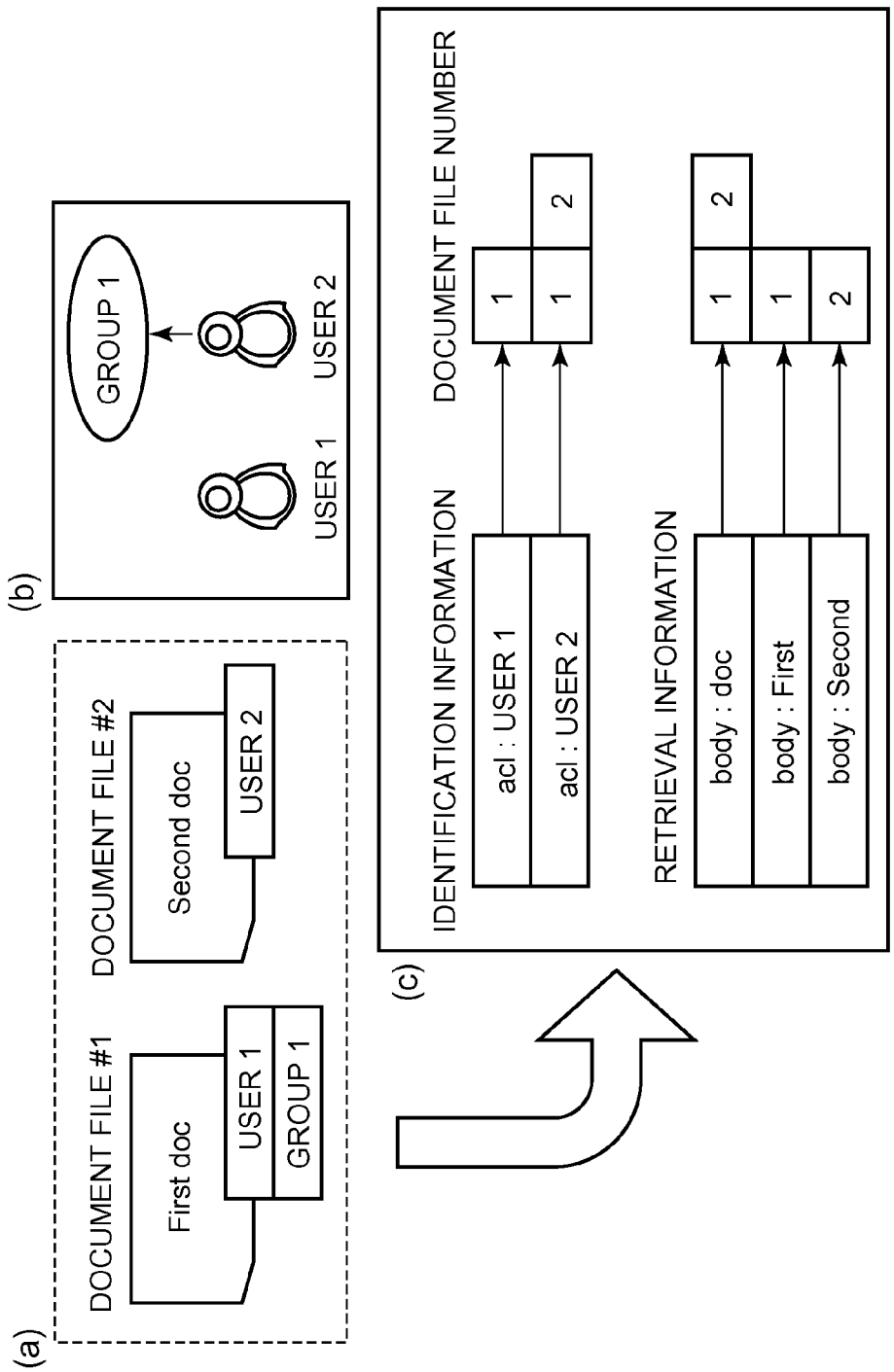
FIG. 5 is an illustrative diagram of document files provided with authority information, the relationship between groups and users, and index information in the retrieval device according to the first embodiment of the present invention.

FIG. 4 shows a flowchart illustrating a procedure in the CPU 11 of the retrieval device 1 according to the first embodiment of the present invention. The CPU 11 of the retrieval device 1 generates correspondence information indicating membership of a user to a group as information indicating correspondence between the group identification information and the user identification information with respect to all group identification information and user identification information included in the authority information provided to document files to be retrieved (step S401). FIG. 5 shows an illustrative diagram of authority information provided to document files, the relationship between groups and users, and the index information in the retrieval device 1 according to the first embodiment of the present invention. In the document file #1 shown in FIG. 5, (a), words "First" and "doc" appear in the document file and authority information includes user identification information "user 1" and group identification information "group 1". Moreover, in the document file #2, words "Second" and "doc" appear in the document file and authority information includes user identification information "user 2". If the group and the users have the relationship as shown in FIG. 5, (b), the CPU 11 generates correspondence information that the user belonging to the group 1 is the user 2, with respect to the user identification information "user 1" and "user 2" and the group identification information "group 1" included in the authority information provided to the document files #1 and #2 to be retrieved in step S401.

Subsequently, the CPU 11 extracts the user identification information associated with the group identification information included in the authority information provided to the document files to be retrieved from the correspondence information generated in step S401 and generates index information including information in which the extracted user identification information is associated with the document files (step S402).

Further, in step S402, the CPU 11 extracts the user identification information "user 2" associated with the group identification information "group 1" included in the authority information provided to the document file #1 from the correspondence information generated in step S401 and generates index information including information in which the extracted user identification information "user 2" is associated with the document file #1. As shown in FIG. 5, (c), the index information generated by the CPU 11 includes information in which the user identification information "user 1" and "user 2" included in the authority information provided to the document files are associated with the document files #1 and #2 (denoted by the document file numbers "1" and "2", respectively, in FIG. 5, (c)) and information in which words "First", "Second", and "doc" appearing in the document files as retrieval information are associated with the document files #1 and #2. For example, the index information generated by the CPU 11 is generated as information in which the user identification information is associated with the document files #1 and #2 if the user identification information is "user 2" (acl:user 2) and in which the retrieval information is associated with the document files #1 and #2 if the retrieval information is "doc" (body:doc).

Subsequently, the CPU 11 receives an input of a retrieval condition such as a keyword and an input of user information indicating a retrieving user in response to an input through the keyboard 21, the mouse 22, or the like (step S403).

Then, the CPU 11 retrieves a document file, which satisfies the retrieval condition whose input is received in step S403 and in which the user identification information included in the index information coincides with the user information whose input is received in step S403, from the document files stored in the storage device 4 (step S404).

For example, in step S404, the CPU 11 retrieves document files #1 and #2, in which the retrieval information included in the index information coincides with the retrieval condition "doc" and in which the user identification information included in the index information coincides with the user information "user 2" whose input is received in step S403 if the retrieval condition whose input is received is "doc" and the user information is "user 2". In other words, the CPU 11 needs to retrieve document files on the basis of the condition (body:doc AND acl:user 2) (AND condition) in which the retrieval information included in the index information coincides with the retrieval condition "doc" and in which the user identification information included in the index information coincides with the user information "user 2".

Even if the authority information provided to the document files includes the group identification information, however, a conventional retrieval device does not extract the user identification information associated with the group identification information from the generated correspondence information and not generate index information in which the extracted user identification information is associated with document files. Therefore, if the authority information includes the group identification information "group 1" like the document file #1 shown in FIG. 5, (a), the conventional retrieval device has not been able to retrieve the document file #1 only by retrieving the document file #2 in which the user identification information included in the index information coincides with the user information indicating the user. Accordingly, to retrieve the document files #1 and #2 in which the retrieval information included in the index information coincides with the retrieval condition "doc" and in which the user identification information included in the index information coincides with the user information "user 2" whose input is received in the conventional retrieval device, it is necessary to retrieve the document files on the basis of the condition body :doc AND (acl:user 2 OR acl:group 1)) in which the retrieval information included in the index information coincides with the retrieval condition "doc" and in which the user identification information included in the index information and the group identification information coincide with the user information or the group information.

It should be noted here that, in the retrieval, the number of document files to be retrieved is limited by the condition for less number of document files to be retrieved among the conditions if the document files are retrieved on the basis of the AND condition while the number of document files to be retrieved is limited by the condition for more number of document files to be retrieved among the conditions if the document files are retrieved on the basis of the OR condition. Therefore, processing load increases if the document files are retrieved on the basis of the condition including the OR condition in comparison with the case of retrieving the document files on the basis of the condition including only the AND condition, which makes it difficult to complete the retrieval in a short time. Accordingly, the retrieval device 1 according to the first embodiment extracts the user identification information associated with the group identification information and generates index information including information in which the extracted user identification information is associated with the document files, which eliminates the necessity of retrieving the document files on the basis of the condition including the OR condition as described above, and therefore the retrieval device 1 is able to complete the retrieval in a short time for presenting a retrieval result of the document files, which satisfy the retrieval condition, to the user having the authority to perform predetermined processing.

Subsequently, the CPU 11 displays the retrieval result of the document files retrieved in step S404 on the display device 23 to present the retrieval result of the document files to the user (step S405).

As described above, in the retrieval device 1 according to the first embodiment of the present invention, the correspondence information generating unit 201 generates the correspondence information indicating the membership of the user to the group as information indicating correspondence between the group identification information and the user identification information with respect to all group identification information and user identification information included in the authority information provided to the document files to be retrieved, and the index information generating unit 202 extracts the user identification information associated with the group identification information included in the authority information provided to the document files from the generated correspondence information and generates index information including information in which the extracted user identification information is associated with the document files. Moreover, the retrieving unit 204 retrieves the document files, which satisfy the retrieval condition and in which the user identification information included in the index information generated by the index information generating unit 202 coincides with the user information whose input is received by the input receiving unit 203, from the document files stored in the storage device 4. Therefore, there is no need to retrieve document files having the group identification information which coincides with the group information of the group to which the retrieving user belongs, by which it is possible to complete the retrieval for presenting the retrieval result of the document files, which satisfy the retrieval condition, to the user having the authority to perform predetermined processing.

Second Embodiment

Figure 6:
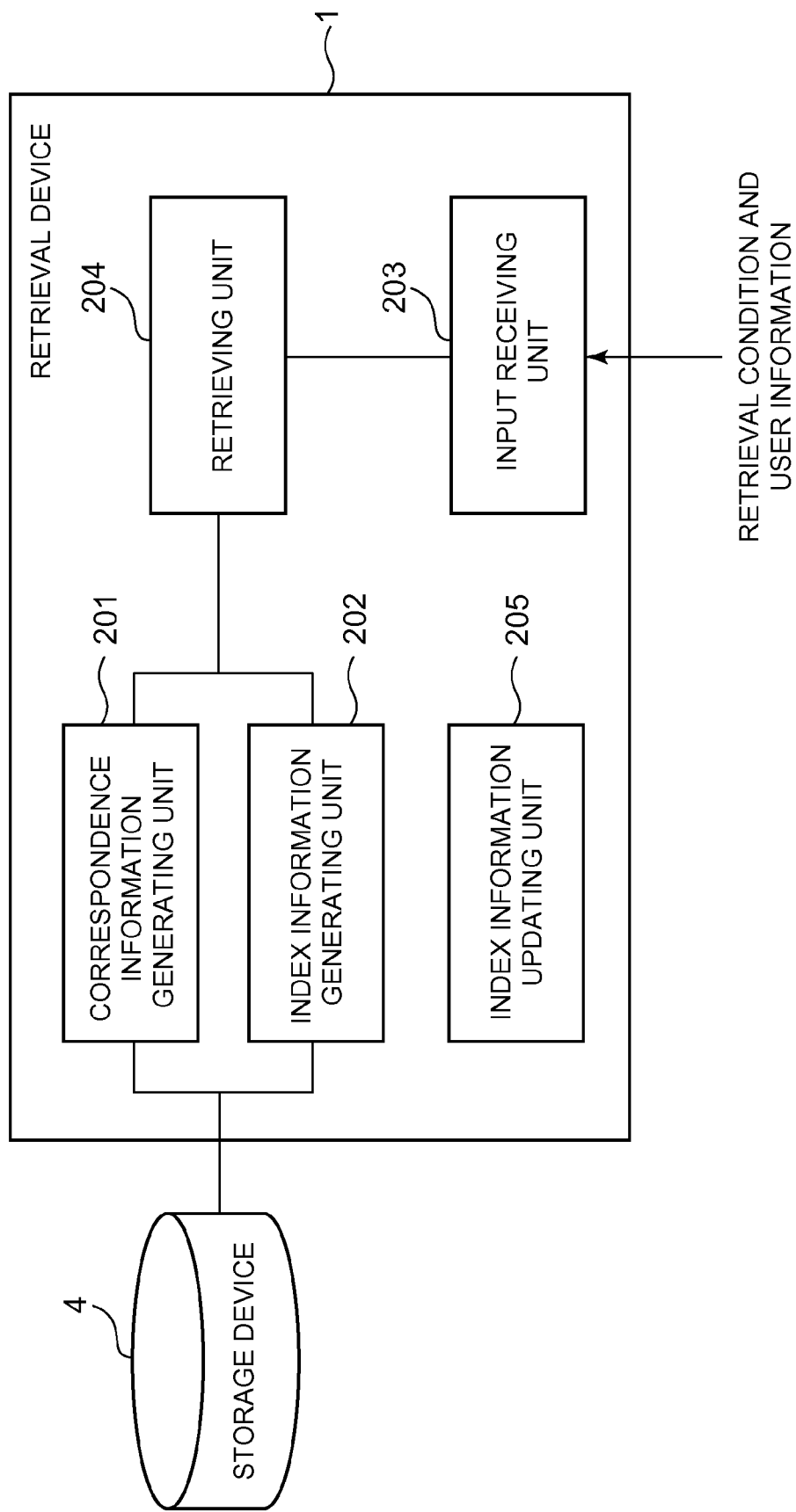
FIG. 6 is a functional block diagram of the retrieval device according to a second embodiment of the present invention.

A second embodiment of the present invention will now be described, focusing on a retrieval device which updates the index information of a document file in the case where the authority information provided to the document file is modified and thus the group identification information and/or user identification information included in the correspondence information is updated. FIG. 6 shows a functional block diagram of the retrieval device 1 according to the second embodiment of the present invention. The retrieval device 1 includes a correspondence information generating unit 201, an index information generating unit 202, an input receiving unit 203, a retrieving unit 204, and an index information updating unit 205. The correspondence information generating unit 201, the index information generating unit 202, the input receiving unit 203, and the retrieving unit 204 of the retrieval device 1 according to the second embodiment are the same as those in the functional block of the retrieval device 1 according to the first embodiment and therefore their detailed description is omitted here.

If the group identification information and/or user identification information included in the authority information provided to the document file is updated, the index information updating unit 205 extracts the index information associated with the updated group identification information and/or user identification information and updates the extracted index information on the basis of the updated group identification information and/or user identification information.

Figure 7:
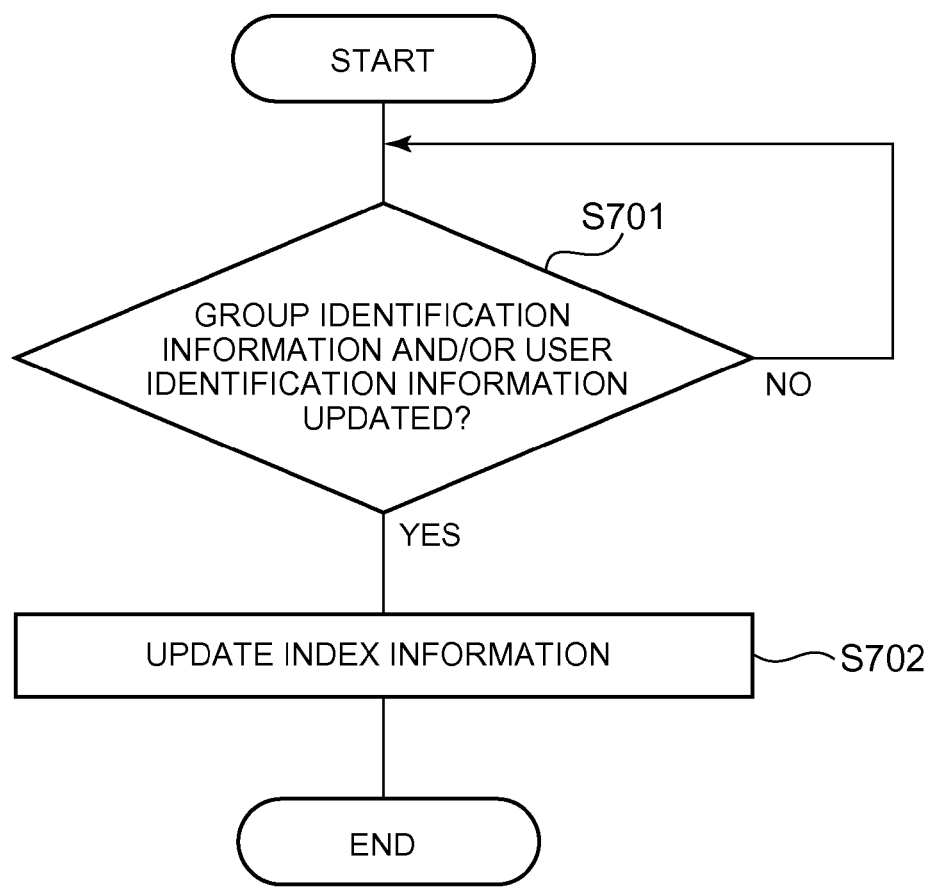
FIG. 7 is a flowchart illustrating a procedure for updating the index information in the CPU of the retrieval device according to the second embodiment of the present invention.

FIG. 7 shows a flowchart illustrating a procedure for updating the index information in the CPU 11 of the retrieval device 1 according to the second embodiment of the present invention. The procedure of the CPU 11 of the retrieval device 1 according to the second embodiment which retrieves the document file is the same as the procedure of the CPU 11 of the retrieval device 1 according to the first embodiment, and therefore its detailed description is omitted here.

The CPU 11 of the retrieval device 1 determines whether an update is made to the group identification information and/or user identification information included in the authority information provided to the document file (step S701). Specifically, the CPU 11 determines whether the group identification information and/or user identification information included in the authority information provided to the document file is updated by updating the correspondence information indicating membership of the user to the group as information indicating the correspondence between the group identification information and the user identification information at a predetermined timing with respect to all group identification information and user identification information included in the authority information provided to the document file to be retrieved and comparing differences in the correspondence information before and after the updating. If the CPU 11 determines that the group identification information and/or user identification information included in the authority information provided to the document file is not updated (step 701: NO), the CPU 11 returns the processing to step S701.

If the CPU 11 determines that the group identification information and/or user identification information included in the authority information provided to the document file is updated (step 701: YES), the CPU 11 extracts the index information of the document file associated with the updated group identification information and/or user identification information and updates the extracted index information on the basis of the updated group identification information and/or user identification information (step S702). Hereinafter, the update of the extracted index information will be described with reference to an illustrative embodiment.

Figure 8:
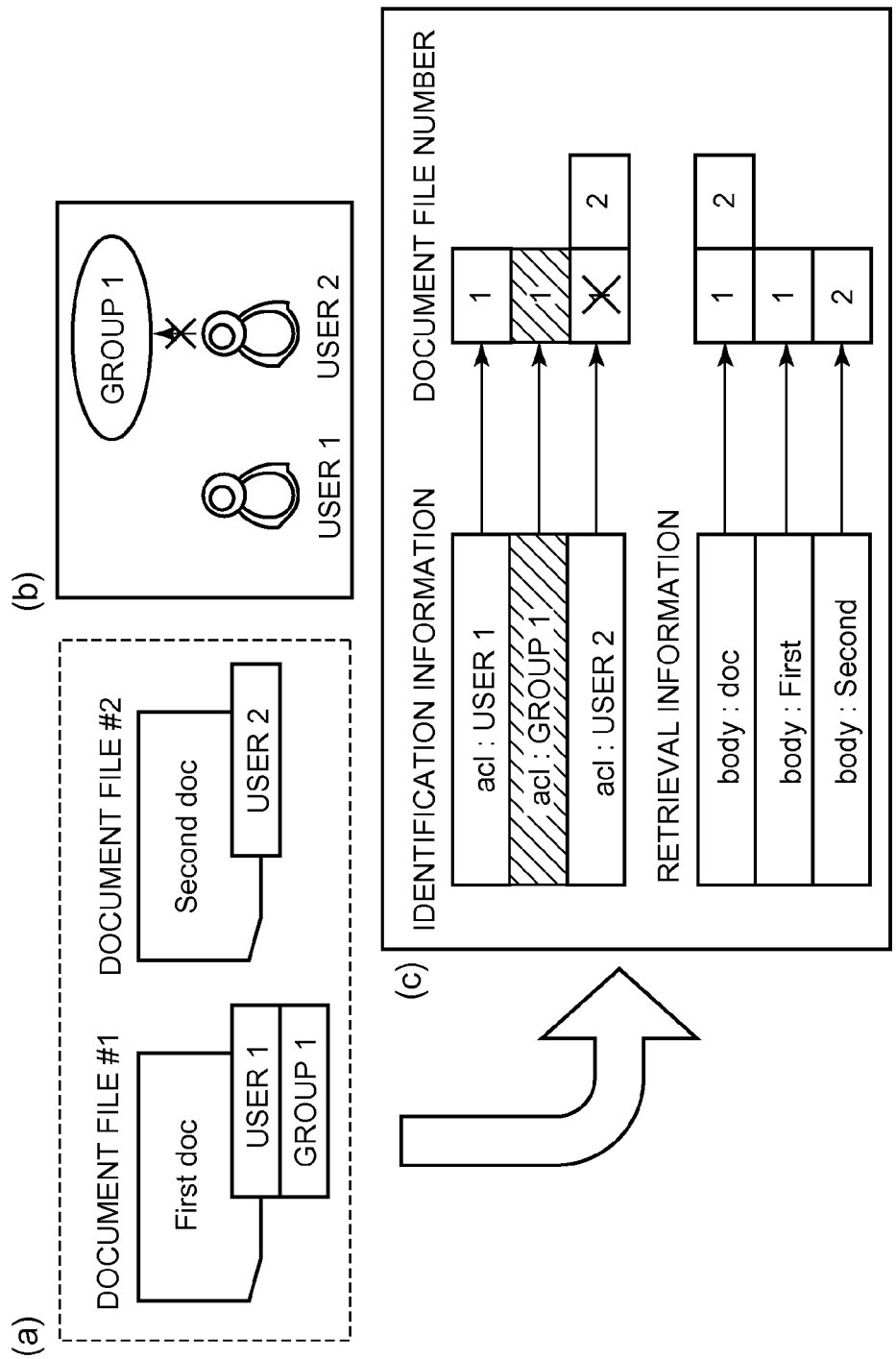
FIG. 8 is an illustrative diagram of document files provided with authority information, the relationship between groups and users, and index information in the retrieval device according to the second embodiment of the present invention.

FIG. 8 shows an illustrative diagram of document files provided with authority information, the relationship between groups and users, and index information in the retrieval device 1 according to the second embodiment of the present invention. In the document file #1 shown in FIG. 8, (a), words "First" and "doc" appear in the document file and authority information includes user identification information "user 1" and group identification information "group 1". Moreover, in the document file #2, words "Second" and "doc" appear in the document file and authority information includes user identification information "user 2". If the group and the users have the relationship as shown in FIG. 8, (b), the CPU 11 generates correspondence information that the user belonging to the group 1 is the user 2, with respect to the user identification information "user 1" and "user 2" and the group identification information "group 1" included in the authority information provided to the document files #1 and #2 to be retrieved.

Further, the CPU 11 generates the index information similarly to the first embodiment. As shown in FIG. 8, (c), the index information generated by the CPU 11 includes information in which the user identification information "user 1" and "user 2" included in the authority information provided to the document files are associated with the document files #1 and #2 (denoted by document file numbers "1" and "2", respectively, in FIG. 8, (c)), information in which the group identification information "group 1" included in the authority information provided to the document file is associated with the document file #1, and information in which words "First", "Second", and "doc" appearing in the document files as retrieval information are associated with the document files #1 and #2. For example, the index information generated by the CPU 11 is generated as information in which the user identification information is associated with the document files #1 and #2 if the user identification information is "user 2" (acl:user 2), in which the group identification information is associated with the document file #1 if the group identification information is "group 1" (acl:group 1), and in which the retrieval information is associated with the document files #1 and #2 if the retrieval information is "doc" (body:doc).

Then, the following describes processing of updating the index information in the case of an update of the group identification information and/or user identification information included in the authority information provided to the document file such as, for example, in the case where the user 2 does not belong to the group 1 any more as indicated by the cross X in FIG. 8, (b). First, the CPU 11 extracts the index information associated with the updated group identification information "group 1" and updates the extracted index information on the basis of the updated group identification information. Specifically, as shown in FIG. 8, (c), the document file associated with the case where the updated group identification information is "group 1" (acl:group 1) is the document file #1. Among the user identification information associated with the document file #1, user identification information required to be updated on the basis of the group identification information in which the user 2 does not belong to the group 1 any more is "user 2". Therefore, the CPU 11 extracts the index information of the document file #1 associated with the case where the user identification information is "user 2" (acl:user 2) among the index information.

The index information of the document file #1 associated with the case where the user identification information is "user 2" (acl:user 2), which is the extracted index information, is updated to the index information, in which the document file #1 is deleted among the document files associated with the case where the user identification information is "user 2" (acl:user 2) on the basis of the updated group identification information (the group identification information in which the user 2 does not belong to the group 1.

With the update of the index information, the document file #1 associated with the case where the user identification information is "user 2" (acl:user 2) is deleted as indicated by the cross X in FIG. 8, (c). The retrieval device 1 according to the second embodiment of the present invention does not retrieve the document file #1 from the document files stored in the storage device 4, if the user information whose input is received is "user 2" (acl:user 2), by updating the index information as shown in FIG. 8, (c).

Figure 9:
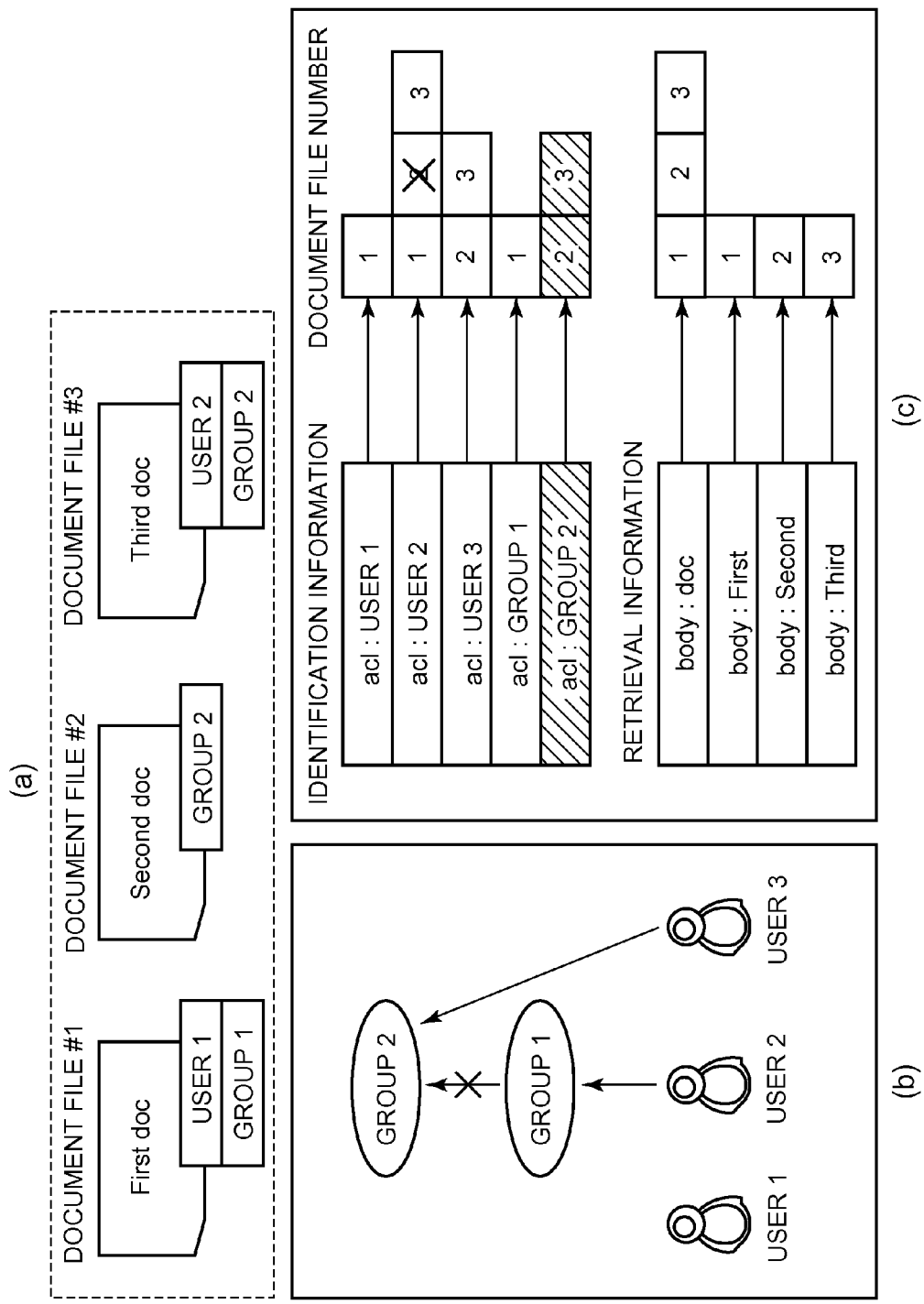
FIG. 9 is another illustrative diagram of document files provided with authority information, the relationship between groups and users, and index information in the retrieval device according to the second embodiment of the present invention.

FIG. 9 shows another illustrative diagram of document files provided with authority information, the relationship between groups and users, and index information in the retrieval device 1 according to the second embodiment of the present invention. In the document file #1 shown in FIG. 9, (a), words "First" and "doc" appear in the document file and authority information includes user identification information "user 1" and group identification information "group 1". Moreover, in the document file #2, words "Second" and "doc" appear in the document file and authority information includes user identification information "user 2". Further, in the document file #3, words "Third" and "doc" appear in the document file and authority information includes user identification information "user 2" and group identification information "group 2". If the group and the users have the relationship as shown in FIG. 9. (b), the CPU 11 generates correspondence information that the user belonging to the group 1 is the user 2 and that the user belonging to the group 2 is the user 3, with respect to the user identification information "user 1", "user 2", and "user 3" and the group identification information "group 1" and "group 2" included in the document files #1, #2, and #3 to be retrieved.

Further, the CPU 11 generates the index information similarly to the first embodiment. As shown in FIG. 9, (c), the index information generated by the CPU 11 includes information in which the user identification information "user 1" and "user 2" included in the authority information provided to the document files are associated with the document files #1, #2, and #3 (denoted by document file numbers "1", "2", and "3", respectively, in FIG. 9, (c), information in which the group identification information "group 1" and "group 2" included in the authority information provided to the document files are associated with the document files #1, #2, and #3, and information in which words "First", "Second", "Third", and "doc" appearing in the document files as retrieval information are associated with the document files #1, #2, and #3. For example, the index information generated by the CPU 11 is generated as information in which the user identification information is associated with the document files #1, #2, and #3 if the user identification information is "user 2" (acl:user 2), in which the group identification information is associated with the document files #2 and #3 if the group identification information is "group 2" (acl:group 2), and in which the retrieval information is associated with the document files #1, #2, and #3 if the retrieval information is "doc" (body:doc).

Then, the following describes processing of updating the index information in the case of an update of the group identification information and/or user identification information included in the authority information provided to the document file such as, for example, in the case where the group 2 does not include the group 1 any more as indicated by the cross X in FIG. 9, (*b*). First, the CPU 11 extracts the index information associated with the updated group identification information "group 2" and updates the extracted index information on the basis of the updated group identification information. Specifically, as shown in FIG. 9, (*c*), document files associated with the case where the updated group identification information is "group 2" (acl:group 2) are document files #2 and #3. Among the user identification information associated with the document files #2 and #3, user identification information required to be updated on the basis of the group identification information in which the group 2 does not include the group 1 any more is "user 2" belonging to the group identification information "group 1". Therefore, the CPU 11 extracts the index information of the document files #2 and #3 associated with the case where the user identification information is "user 2" (acl:user 2) among the index information.

The index information of the document files #2 and #3 associated with the case where the user identification information is "user 2" (acl:user 2), which is the extracted index information, is updated to the index information, in which the document files #2 and #3 are deleted, among the document files associated with the case where the user identification information is "user 2" (acl:user 2) on the basis of the updated group identification information (the group identification information in which the group 1 does not belong to the group 2). Note that, however, as shown in FIG. 9, (*a*), the authority information of the document file #3 includes the user identification information "user 2" besides the group identification information "group 2" and therefore, even if the group 1 does not belong to the group 2 any more, the document file #3 is maintained to be associated with the index information in which the user identification information is "user 2" (acl:user 2).

With the update of the index information, the document file #2 associated with the case where the user identification information is "user 2" (acl:user 2) is deleted as indicated by the cross X in FIG. 9, (*c*). The retrieval device 1 according to the second embodiment of the present invention does not retrieve the document file #2 from the document files stored in the storage device 4 if the user information whose input is received is "user 2" (acl:user 2) by updating the index information as shown in FIG. 9, (*c*).

The retrieval device 1 according to the second embodiment of the present invention extracts the index information associated with the updated group identification information and/or user identification information (for example, index information "acl:user 2" in the case where the user identification information is "user 2") and updates the extracted index information on the basis of the updated group identification information and/or user identification information when updating the index information of the document files as shown in FIG. 8, (*c*), and FIG. 9, (*c*), and therefore there is no need to update all index information of the document files.

As described hereinabove, in the retrieval device 1 according to the second embodiment of the present invention, the index information updating unit 205 extracts the index information associated with the updated group identification information and/or user identification information if an update is made to the group identification information and/or user identification information included in the authority information provided to the document files and then updates the extracted index information on the basis of the updated group identification information and/or user identification information, and therefore there is no need to update all index information of the document files, thereby enabling the update of the index information to be processed at high speed. With the enabled high-speed processing of updating the index information of the document files, it becomes possible to reflect modified authority information efficiently on the index information of the document files in the case of the modification of the authority information provided to the document files so as to reduce the time until the index information of the document files is updated.

DESCRIPTION OF REFERENCE NUMERALS

1 Retrieval device
2 Network
3 Computer
4 Storage device
11 CPU
12 Memory
13 Storage unit
14 I/O interface
15 Video interface
16 Portable disk drive
17 Communication interface
18 Internal bus
23 Display device
90 Portable recording medium
100 Computer program

The invention claimed is:

1. A retrieval device for retrieving a document file, which is provided with authority information, the retrieval device comprising:
a central processing unit; and
storage coupled to the central processing unit, wherein the storage stores a computer program, and wherein the central processing unit executes the computer program to perform operations, wherein the operations comprise:
generating index information by extracting user identification information included in the authority information and the user identification information associated with group identification information included in the authority information, wherein the index information includes information in which the extracted user identification information is associated with the document file by storing identification information that includes the user identification information and a document identifier for the document file and storing retrieval information that includes document content and a document identifier for the document file;
receiving an input of a retrieval condition and an input of user information indicating a retrieving user; and
retrieving at least one document file that satisfies the retrieval condition whose input is received and in which the user identification information included in the index information coincides with the user information whose input is received.

2. The retrieval device according to claim 1, wherein a first group includes a second group, wherein the first group is associated with a first document file, and wherein the index information includes information in which each user that is a member of the second group is associated with the first document file.

3. The retrieval device according to claim 1, wherein the at least one document file is retrieved without retrieving document files having the group identification information which coincides with the group information of the group to which the retrieving user belongs.

4. The retrieval device according to claim 1, wherein the operations further comprise:
   extracting the index information associated with at least one of updated group identification information and user identification information included in the authority information provided to the document file; and
   updating the extracted index information on the basis of at least one of the updated group identification information and user identification information.

5. The retrieval device according to claim 4, wherein the operations further comprise:
   determining that a user no longer belongs to a first group having group identification information associated with a first document; and
   updating the index information to indicate that the user that no longer belongs to the first group is no longer associated with the first document file.

6. A retrieval system, comprising:
   a central processing unit; and
   storage coupled to the central processing unit, wherein the storage stores a computer program, and wherein the central processing unit executes the computer program to perform operations, wherein the operations comprise:
      generating index information by extracting user identification information included in the authority information and the user identification information associated with group identification information included in the authority information, wherein the index information includes information in which the extracted user identification information is associated with the document file by storing identification information that includes the user identification information and a document identifier for the document file and storing retrieval information that includes document content and a document identifier for the document file;
      receiving an input of a retrieval condition and an input of user information indicating a retrieving user; and
      retrieving at least one document file that satisfies the retrieval condition whose input is received and in which the user identification information included in the index information coincides with the user information whose input is received, and wherein the at least one document file is retrieved without retrieving document files having the group identification information which coincides with the group information of the group to which the retrieving user belongs.

7. The retrieval system according to claim 6, wherein a first group includes a second group, wherein the first group is associated with a first document file, and wherein the index information includes information in which each user that is a member of the second group is associated with the first document file.

8. The retrieval system according to claim 6, wherein the operations further comprise:
   extracting the index information associated with at least one of updated group identification information and user identification information included in the authority information provided to the document file; and
   updating the extracted index information on the basis of at least one of the updated group identification information and user identification information.

9. The retrieval system according to claim 8, wherein the operations further comprise:
   determining that a user no longer belongs to a first group having group identification information associated with a first document; and
   updating the index information to indicate that the user that no longer belongs to the first group is no longer associated with the first document file.

10. A computer-implemented retrieval method for retrieving a document file, which is provided with authority information, comprising:
    generating index information by extracting user identification information included in the authority information and the user identification information associated with group identification information included in the authority information, wherein the index information includes information in which the extracted user identification information is associated with the document file by storing identification information that includes the user identification information and a document identifier for the document file and storing retrieval information that includes document content and a document identifier for the document file;
    receiving an input of a retrieval condition and an input of user information indicating a retrieving user; and
    retrieving at least one document file that satisfies the retrieval condition whose input is received and in which the user identification information included in the index information coincides with the user information whose input is received.

11. The computer-implemented retrieval method according to claim 10, wherein a first group includes a second group, wherein the first group is associated with a first document file, and wherein the index information includes information in which each user that is a member of the second group is associated with the first document file.

12. The computer-implemented retrieval method according to claim 10, wherein the the at least one document file is retrieved without retrieving document files having the group identification information which coincides with the group information of the group to which the retrieving user belongs.

13. The computer-implemented retrieval method according to claim 10, further comprising:
    extracting the index information associated with at least one of updated group identification information and user identification information included in the authority information provided to the document file; and
    updating the extracted index information on the basis of at least one of the updated group identification information and user identification information.

14. The computer-implemented retrieval method according to claim 13, further comprising:
    determining that a user no longer belongs to a first group having group identification information associated with a first document; and
    updating the index information to indicate that the user that no longer belongs to the first group is no longer associated with the first document file.

15. A non-transitory medium that stores a computer program, which retrieves a document file, which is provided with authority information, wherein the computer program runs on a computer and causes the computer to perform:
    generating index information by extracting user identification information included in the authority information and the user identification information associated with group identification information included in the authority information, wherein the index information includes information in which the extracted user identification information is associated with the document file by storing identification information that includes the user identification information and a document identifier for the document file and storing retrieval information that includes document content and a document identifier for the document file;

receiving an input of a retrieval condition and an input of user information indicating a retrieving user; and retrieving at least one document file that satisfies the retrieval condition whose input is received and in which the user identification information included in the index information coincides with the user information whose input is received.

16. The non-transitory medium that stores the computer program according to claim 15, wherein a first group includes a second group, wherein the first group is associated with a first document file, and wherein the index information includes information in which each user that is a member of the second group is associated with the first document file.

17. The non-transitory medium that stores the computer program according to claim 15, wherein the at least one document file is retrieved without retrieving document files having the group identification information which coincides with the group information of the group to which the retrieving user belongs.

18. The non-transitory medium that stores the computer program according to claim 15, wherein the computer program causes the computer to:

extract the index information associated with at least one of updated group identification information and user identification information included in the authority information provided to the document file; and update the extracted index information on the basis of at least one of the updated group identification information and user identification information.

19. The non-transitory medium that stores the computer program according to claim 18, wherein the computer program causes the computer to:

determine that a user no longer belongs to a first group having group identification information associated with a first document; and update the index information to indicate that the user that no longer belongs to the first group is no longer associated with the first document file.

\* \* \* \* \*